(12) United States Patent
Getman

(10) Patent No.: US 9,160,920 B2
(45) Date of Patent: Oct. 13, 2015

(54) IMAGING SYSTEM AND METHOD OF AUTOFOCUSING THE SAME

(71) Applicant: Samsung Electronics Co., Ltd, Suwon-si, Gyeonggi-do (KR)

(72) Inventor: Alexander Getman, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/221,442

(22) Filed: Mar. 21, 2014

(65) Prior Publication Data

US 2014/0340561 A1    Nov. 20, 2014

(30) Foreign Application Priority Data

May 14, 2013  (KR) .................. 10-2013-0054460

(51) Int. Cl.
*H04N 5/225* (2006.01)
*H04N 5/232* (2006.01)
*H04N 7/18* (2006.01)
*H04N 5/262* (2006.01)
*G03B 13/00* (2006.01)

(52) U.S. Cl.
CPC .......... *H04N 5/23212* (2013.01); *H04N 5/2258* (2013.01); *H04N 7/181* (2013.01)

(58) Field of Classification Search
CPC ............ H04N 5/3415; H04N 5/23238; H04N 5/23212; H04N 5/2356; G03B 37/04
USPC ................. 348/218.1, 239, 345–353
See application file for complete search history.

(56) References Cited

U.S. PATENT DOCUMENTS

| | | | |
|---|---|---|---|
| 5,170,202 A | 12/1992 | Bell | |
| 5,589,909 A | 12/1996 | Kusaka | |
| 7,079,763 B2 | 7/2006 | Hirai | |
| 7,158,168 B2 | 1/2007 | Houlberg | |
| 7,801,433 B2 | 9/2010 | Funaki et al. | |
| 2005/0207486 A1 | 9/2005 | Lee et al. | |
| 2010/0118151 A1 | 5/2010 | Takano et al. | |
| 2011/0122308 A1 | 5/2011 | Duparre | |
| 2012/0050490 A1* | 3/2012 | Chen et al. | 348/47 |
| 2014/0002674 A1* | 1/2014 | Duparre et al. | 348/187 |
| 2014/0111650 A1* | 4/2014 | Georgiev et al. | 348/159 |

FOREIGN PATENT DOCUMENTS

| | | |
|---|---|---|
| JP | 2001-245280 | 9/2001 |
| JP | 2007-027830 | 2/2007 |
| JP | 2012-114655 | 6/2012 |
| JP | 2012-133194 | 7/2012 |

(Continued)

OTHER PUBLICATIONS

Simon Baker et al., "Limits on Super-Resolution and How to Break Them", IEEE Conference on Computer Vision and Pattern Recognition (2000).

(Continued)

*Primary Examiner* — Kelly L Jerabek
(74) *Attorney, Agent, or Firm* — Ellsworth IP Group PLLC

(57) ABSTRACT

Provided is an imaging system and a method of autofocusing the same. The imaging system includes a camera array including a plurality of cameras to image an image, and a control circuit to control the plurality of cameras to autofocus, and to output a single image by combining images output from the plurality of cameras.

20 Claims, 6 Drawing Sheets

(56) References Cited

FOREIGN PATENT DOCUMENTS

KR     10-1038815     5/2011
KR     10-1109695     1/2012

OTHER PUBLICATIONS

Jacques Duparre et al., "Novel Optics/Micro-Optics for Miniature Imaging Systems", Photonics in Multimedia (2006).

Matthieu Maitre et al., "Symmetric Multi-View Stereo Reconstruction From Planar Camera Arrays", Computer Vision and Pattern Recognition (2008).

Xin Xu et al., "Robust Automatic Focus Algorithm for Low Contrast Images Using a New Contrast Measure", Sensors 2011.

Ren Ng et al., "Light Field Photography with a Hand-held Plenoptic Camera", Stanford University Computer Science Tech Report CSTR Feb. 2005, (2005).

Sina Farsiu et al., "Fast and Robust Multiframe Super Resolution", IEEE Transactions on Image Processing (2003).

Bennett Wilburn et al., "High Performance Imaging Using Large Camera Arrays", ACM Transactions on Graphics (2005).

\* cited by examiner

IMAGING SYSTEM AND METHOD OF AUTOFOCUSING THE SAME

CROSS-REFERENCE TO RELATED APPLICATIONS

This U.S. non-provisional patent application claims priority under 35 U.S.C. §119 from Korean Patent Application No. 10-2013-0054460, filed on May 14, 2013, the entire contents of which are hereby incorporated by reference.

BACKGROUND OF THE INVENTION

1. Field of the Invention

The present disclosure herein relates to an imaging system and a method of autofocusing the same.

2. Description of the Related Art

Autofocus (AF) is a function of an optical system automatically focusing on a subject. An AF scheme is largely divided into active and passive schemes. In the active scheme an ultrasonic wave or an infrared ray is emitted to measure a distance to the subject.

In the active scheme, when a glass or other transparent object is interposed between a camera and a subject, the subject is not properly focused because the object reflects the ultrasonic wave or the infrared ray. Also, it is difficult for the optical system in the active scheme to focus on a distant subject due to the limit of a distance that the ultrasonic wave or the infrared ray can reach.

In the passive scheme, a subject is focused on by using a light naturally reflected by the subject. The passive scheme is largely divided into an optical triangulation scheme, a contrast detection scheme, and a phase detection scheme. Here, in the contrast detection scheme, contrast of a portion of an image is continuously calculated while a lens is moved, and, when the contrast becomes a maximum, the image is determined as being in focus.

SUMMARY OF THE INVENTION

Exemplary embodiments of the present general inventive concept provide an imaging system performing autofocus rapidly and a method of autofocusing the same.

Additional features and utilities of the present general inventive concept will be set forth in part in the description which follows and, in part, will be obvious from the description, or may be learned by practice of the general inventive concept.

Exemplary embodiments of the present general inventive concept provide an imaging system including a camera array including a plurality of cameras to image an image, and a control circuit controlling the plurality of cameras to autofocus, and to output a single image by combining images output from the plurality of cameras.

Fields of view of the plurality of cameras may be partially or completely overlapped.

At least two of the plurality of cameras may have different exposure settings.

The control circuit may be implemented as a single module which is separated from the camera array.

The camera array may be implemented as a monolithic assembly.

The autofocus may be passive contrast detection autofocus.

Controlling the plurality of cameras to autofocus may include dividing an autofocus range to correspond to each of the plurality of cameras, and controlling the plurality of cameras to scan the divided autofocus range.

The control circuit may scan the divided autofocus range corresponding to each of the plurality of cameras and estimate focus value curves.

The control circuit may convert the estimated focus value curves into a camera independent focus value curve according to a previously determined correction function.

The previously determined correction function may be determined experimentally or on the basis of data imaged by a user.

In the previously determined correction function, the focus value curves and the camera independent focus value curve may have a bijective relationship.

The imaging system may further include autofocus drivers controlling the plurality of cameras in response to control signals generated from the control circuit for the autofocus.

Exemplary embodiments of the present general inventive concept further provide an autofocusing method of an imaging system including a camera array including a plurality of cameras and a control circuit independently controlling the plurality of cameras, the autofocusing method including dividing an autofocus range into a plurality of ranges respectively corresponding to the plurality of cameras, scanning, by the plurality of cameras, the corresponding divided ranges, estimating focus value curves by using the scanned results from the plurality of cameras, converting the estimated focus curves into a camera independent focus value curve by using a previously determined correction function, and determining autofocus by using the camera independent focus value curve.

The estimating of the focus value curves may include setting lenses of the plurality of cameras to focus along a predetermined distance, imaging a target image by using the set camera lenses, selecting a focus region corresponding to the imaged image, estimating focus values, and updating the focus value curves by adding the estimated focus values.

The determining of the autofocus may include finding a maximum value from the camera independent focus value curve, generating control signals corresponding to the maximum value, and controlling the plurality of cameras in response to the control signals.

A non-transitory computer-readable recording medium may contain computer-readable codes as a program to execute the autofocusing method of the imaging system.

Exemplary embodiments of the present general inventive concept also provide an imaging system including a camera array including a plurality of cameras to capture a corresponding plurality of images, and a control circuit to control each of the plurality of cameras to perform an autofocus operation over a corresponding autofocus range, to determine a camera independent focus value curve based on the autofocus operation, and to generate an output image by using the determined camera independent focus value curve.

Exemplary embodiments of the present general inventive concept also provide an imaging method including controlling each of the plurality of cameras to perform an autofocus operation over a corresponding autofocus range, determining a camera independent focus value curve based on the autofocus operation, controlling the plurality of cameras to capture a corresponding plurality of images, and generating an output image by using the determined camera independent focus value curve.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
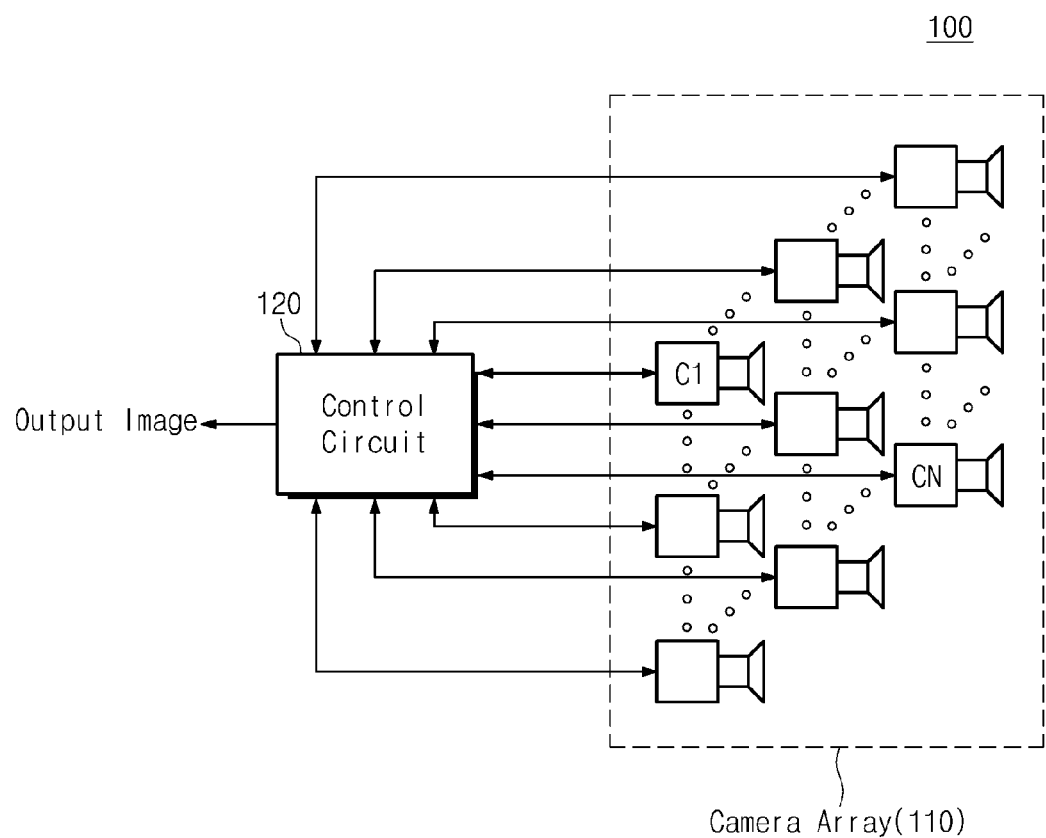
FIG. 1 is a view illustrating an exemplary imaging system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

An imaging system 100 according to an exemplary embodiment of the present general inventive concept may rapidly perform autofocus (AF) by independently controlling a plurality of cameras C1 to CN that are arrayed to allow fields of view (FOVs) of the cameras C1 to CN to partially or completely overlap each other. Here, AF may be passive contrast detection AF.

FIG. 1 is a view illustrating an exemplary imaging system 100 according to an exemplary embodiment of present general inventive concept. Referring to FIG. 1, the imaging system 100 includes a camera array 110 and a control circuit 120 controlling the camera array 110.

The camera array 110 includes a plurality of cameras C1 to CN, N is an integer of 2 or greater. The plurality of cameras C1 to CN are arrayed to allow FOVs of the cameras C1 to CN to partially or completely overlap each other. Distances between each of the plurality of cameras C1 to CN may be minimized in order to reduce parallax distortions. This assures that images imaged by each of the plurality of cameras C1 to CN are virtually identical (namely, one target image is imaged). The plurality of cameras C1 to CN may be simultaneously focused on different portions of the imaged scene by respectively including an independently controllable focusing mechanism.

For the purposes of the present general inventive concept as described herein, "imaging" an image is defined as capturing an image of a subject or a scene with at least one of the cameras C1 to CN. The operation of capturing an image includes obtaining an image, for example through an image sensor 2040 (illustrated in FIG. 7) of the cameras C1 to CN, and storing the obtained image.

In an exemplary embodiment, the camera array 110 may be configured to be separated from a camera module (not illustrated). Here, the camera module is a block controlling the plurality of cameras C1 to CN.

In an exemplary embodiment, the camera array 110 may be implemented as monolithic assembly of cameras C1 to CN. That is, the cameras C1 to CN are arranged so as not to be separable from one another.

In an exemplary embodiment, resolution of an output image may be compared with those of images imaged by the cameras C1 to CN of the camera array 110.

In an exemplary embodiment, the cameras C1 to CN of the camera array 110 may include various patterns of color filters. Here, the various patterns are not limited to Bayer, uniform panchromatic, or infrared patterns, but may be patterns without color filters used.

In an exemplary embodiment, the cameras C1 to CN of the camera array 110 may operate in different exposure settings.

In an exemplary embodiment, each of the cameras C1 to CN independently performs contrast detection AF operation.

The camera array 110 according to an exemplary embodiment of present general inventive concept, compared to a single camera, may provide images having an extended dynamic range, an enhanced image space, and a spectral resolution. Also it provides information on a 3-dimensional scene structure.

The control circuit 120 may combine images output from all the cameras C1 to CN to form a single output image, and generate option data such as a depth map, or a light field. Also, the control circuit 120 may control the cameras C1 to CN to estimate a focus value curve (FVC) by using a contrast detection AF scheme in parallel. Here, focus values measured by the different cameras C1 to CN may be coincided with each other in the contrast detection AF scheme. This coincidence may be achieved by complex measurements including a focus value estimating operation, an optimized parallel scan of an AF range, and a proper design for system calibration.

In an exemplary embodiment, the AF range scanning may be performed by all the cameras C1 to CN of the camera array 110. Here, the cameras C1 to CN include independently controllable focusing elements (not illustrated), and each of the cameras C1 to CN may scan a portion of the AF range.

In an exemplary embodiment, for each of the cameras C1 to CN of the camera array 110, optimal focusing conditions may be determined by an analysis of the FVC obtained for each portion of the AF range.

In an exemplary embodiment, the imaging system 100 may use calibration for a camera independent FVC (CIFVC) in order to make an analysis for the FVCs easy. Here, the CIFVC may be represented as a calibration function indicating a relationship between the FVCs. For example, it is difficult to quantitatively compare a first focus value FV1 of a first camera C1 with a second focus value FV2 of a second camera CN2. That is because the first focus value FV1 of the first camera C1 has correlation with the second focus value FV2 of the second camera CN2. Accordingly, in order to enable the quantitative comparison, the calibration function of the present general inventive concept may convert the first focus value FV1 of the first camera C1 and the second focus value FV2 of the second camera CN2. The control circuit 120 may compare the first and second focus values converted by the calibration function, and select an optical focus value of the camera array 110 according to the comparison result.

In an exemplary embodiment, CIFVC calibration, which is a production phase portion, may be performed in a lab environment. In another exemplary embodiment, the CIFVC calibration may be performed on the basis of data imaged by a user in a background process. In an exemplary embodiment, in order to enhance calibration accuracy, the calibration performed in the lab environment may be combined with the calibration performed on the basis of the data imaged by a user.

The imaging system 100 according to an exemplary embodiment of the present general inventive concept may include the plurality of cameras C1 to CN and the control circuit 120 independently performing AF controls with regard to each of the cameras C1 to CN.

The imaging system according to an exemplary embodiment of the present general inventive concept may rapidly perform AF by including a plurality of independently controllable cameras C1 to CN, dividing an AF range into plural ranges, and scanning the divided ranges in parallel.

Figure 2:
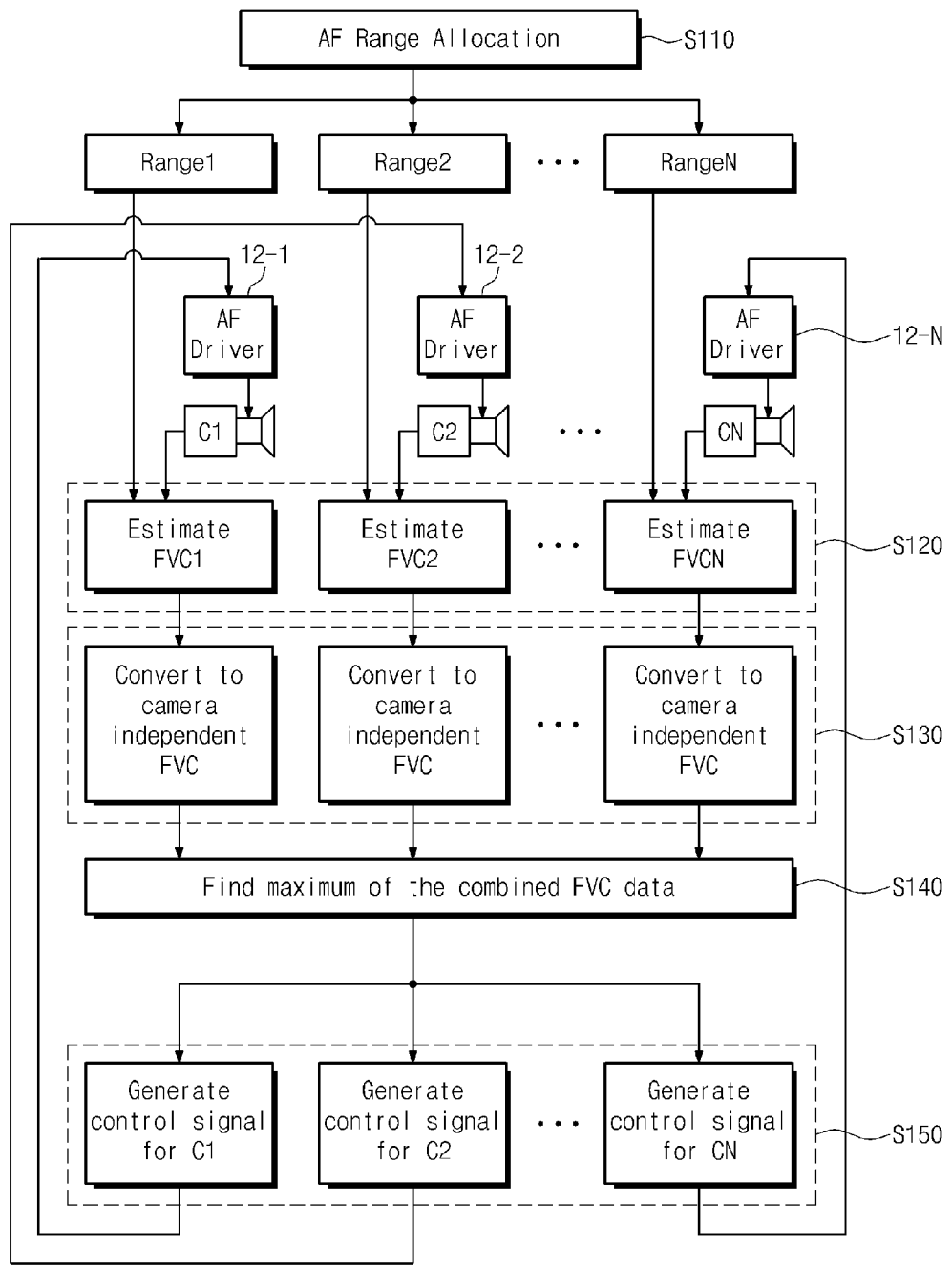
FIG. 2 is a view illustrating an exemplary autofocus operation of a camera array according to an exemplary embodiment of the present general inventive concept.

FIG. 2 illustrates an exemplary AF operation of the camera array 110 according to an exemplary embodiment of the present general inventive concept. Referring to FIG. 2, the AF operation may be performed as follows. When a user decided to image a scene, the control circuit may allocate an AF range scan job to the cameras C1 to CN of the camera array 110 for the AF (operation S110). As a result, each of the cameras C1 to CN may scan small portions of an original AF range, which are designated as "range 1", "range 2", and etc. Since the cameras C1 to CN scan only the small ranges of the AF range, an autofocusing speed can be greatly improved compared to that of a typical art.

In an exemplary embodiment, in order to finely adjust balance between a speed and robustness of the AF, a partitioning method for the AF range may be controlled. For example, while the number of points of the estimated FVC increases, overlapping of partitions may improve consistency of the FVC estimation between different cameras C1 to CN of the camera array 110. Due to this, since the image contrast is not uniform in the AF range, an optimal partition may be heuristically obtained by estimating performance of an operating system under various conditions.

The focus value curves FVC1 to FVCN may be estimated from each of the cameras C1 to CN (operation S120). The estimated focus value curves FVC1 to FVCN may be converted into CIFVC data (operation S130). A maximum value is searched for from among combined CIFVC data (operation S140). Control signals may be generated for controlling each of the cameras C1 to CN on the basis of the maximally combined CIFVC data (operation S150). In response to the generated control signals, AF drivers 12-1 to 12-N may be controlled. Here, the AF drivers 12-1 to 12-N may be included in the control circuit 120 illustrated in FIG. 1.

Figure 3:
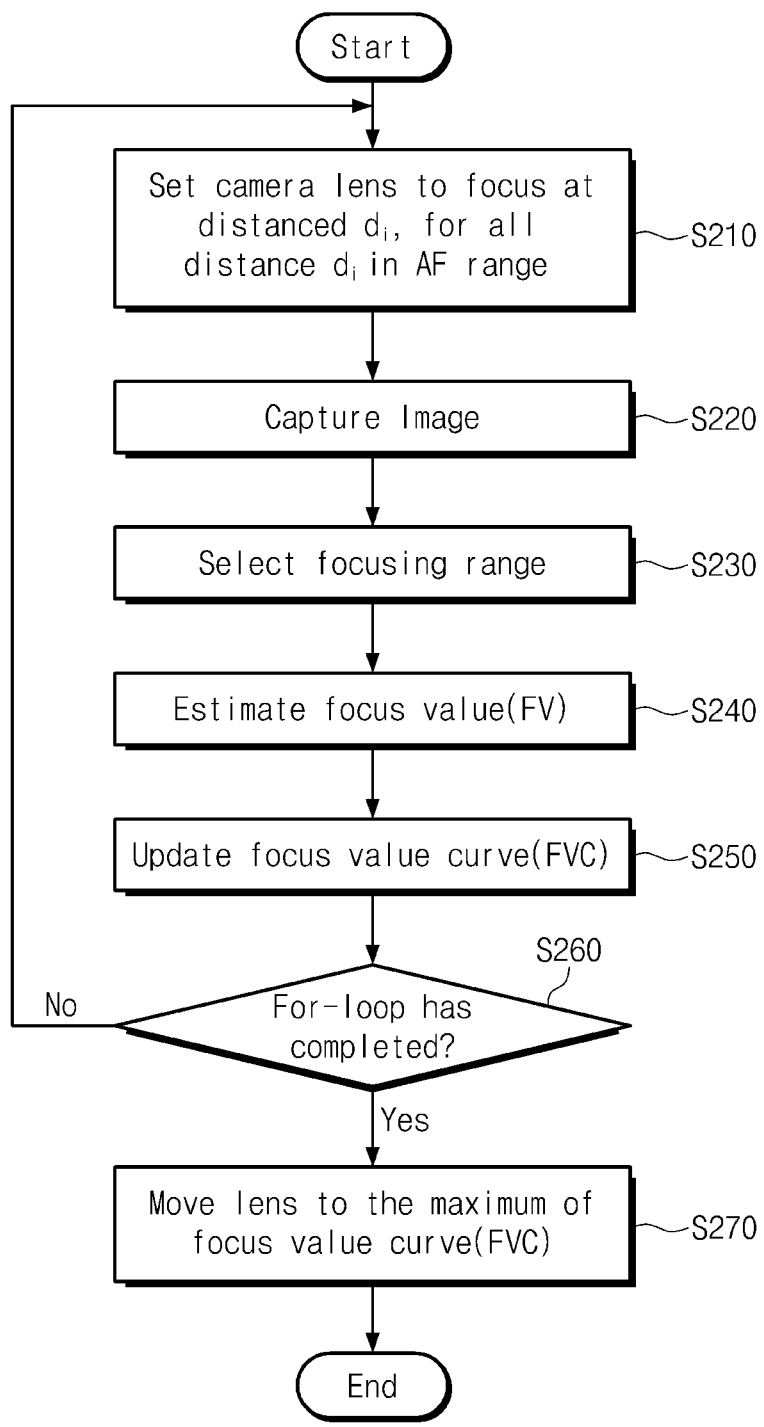
FIG. 3 is a flow chart illustrating an exemplary estimation operation of a focus value curve (FVC) according to an exemplary embodiment of the present general inventive concept.

FIG. 3 is a flow chart illustrating exemplary estimation operation of FVCs according to an exemplary embodiment of the present general inventive concept. Referring to FIG. 3, the FVC estimation operation is as follows. For all distances di in the AF range, a camera C1 to CN may be set to be focused (operation S210). Images may be captured by using the set camera C1 to CN (operating S220). A focus range is selected (operation S230). Then, focus values (FVs) are estimated (operation S240), and a FVC may be updated (operation S250). It is then determined whether a for-loop is completed (operation S260). For the purposes of this exemplary embodiment of the present general inventive concept, the "for-loop" is defined as an algorithm which determines a FVC of a camera C1 to CN based on a predetermined number of iterations of operations S210-S250. When the for-loop is not completed (operation S260-N), operation S210 is processed again. In contrast, when the for-loop is completed (operation S260-Y), a lens may be moved to a position corresponding to the maximum value of the FVC (operation S270).

Referring to FIG. 3, a portion of the AF range may be classified into a finite set of focal planes on which the FVC is to be estimated. Focus values may be calculated for each position on the focal plane of an AF target determined in advance. The AF target may be identical for all the cameras C1 to CN in order to compare focus values estimated by the different cameras C1 to CN of the camera array 110. The focus values may be estimated by using the exactly same scheme as that of contrast detection AF for a single camera (in a size of a high frequency element of an imaged image).

Furthermore, when the FVCs are calculated for all the cameras C1 to CN, the FVCs may be integrated into a single function that characterizes image definitions at positions on a focal plane in the AF range.

Figure 4:
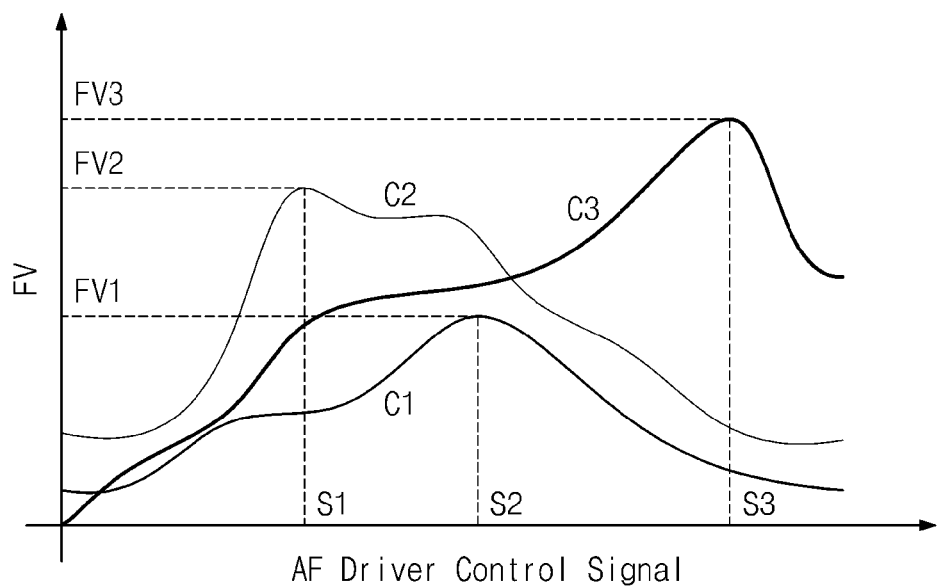
FIG. 4 illustrates exemplary FVCs according an exemplary embodiment of the present general inventive concept.

FIG. 4 illustrates exemplary FVCs for cameras C1 to C3 of the camera array 110 according to an exemplary embodiment of the present general inventive concept. Referring to FIG. 4, the respective cameras C1 to C3 have different FVCs from each other. Maximum focus values FV1, FV2, and FV3 are generated from control signals S1, S2, and S3 of different AF drivers 12-1, 12-2, and 12-3. Even though an imaged scene and focal planes of all the cameras C1 to C3 of the camera array 110 are identical, optimal conditions for the focus values FV1, FV2, and FV3 may be different from each other, like the control signals S1, S2, and S3 of the AF drivers 12-1, 12-2, and 12-3.

Referring to FIG. 4 again, since all the cameras C1 to C3 calculate different definitions, a CIFVC function is necessary. Here, the reason why the definitions are different is due to various uncontrollable causes such as a difference between exposure settings, sample modification, and parallax distortion. As illustrated in FIG. 2, a CIFVC calculating operation may be represented by converting FVCs into CIFVC data.

Figure 5:
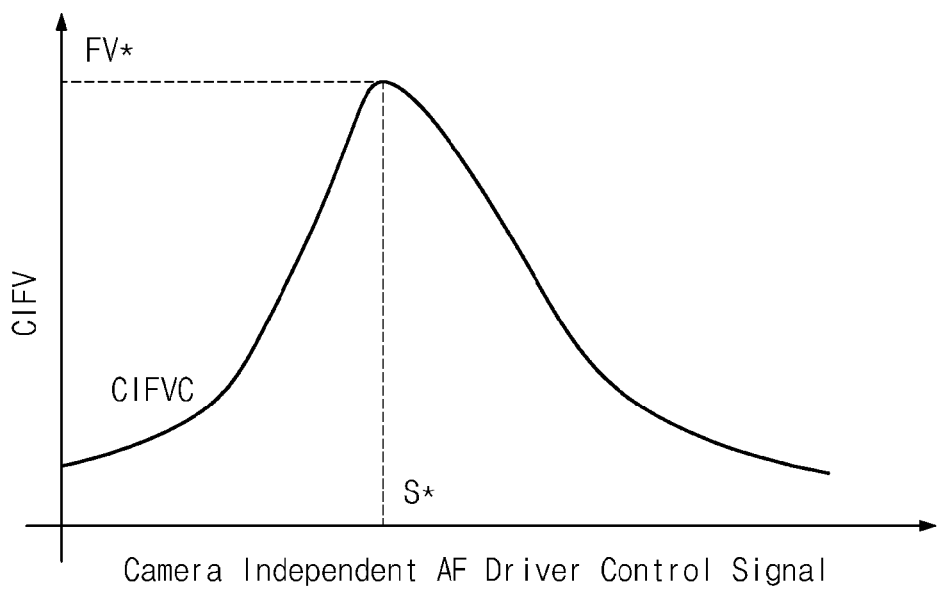
FIG. 5 illustrates exemplary a camera independent FVC (CIFVC) according to an exemplary embodiment of the present general inventive concept.

FIG. 5 illustrates exemplary CIFVCs according to an exemplary embodiment of the present general inventive concept. Referring to FIGS. 4 and 5, a relationship between the CIFVC and the FVC may be understood. According to an exemplary embodiment of the present general inventive concept, a CIFVC function has a bijective (or one-to-one) relationship with all FVCs related to the cameras C1 to CN of the camera array 110. Here, arguments and values of the CIFVC function may be defined as the following meaning. Original FVC deviations generated due to differences between the AF drivers 12-1 to 12-N of cameras C1 to CN and the camera array 110 may be determined by parameters of the bijective (or one-to-one) relationship.

For example, the bijective relationship may exist between optimal focus values (S1, FV1), (S2, FV2), (S3, FV3) illustrated in FIG. 4 and maximum values of coordinates (S*, FV*) in the CIFVC illustrated in FIG. 5.

In an exemplary embodiment of the present general inventive concept, optical focal planes of all the cameras C1 to CN in the camera array 110 may be generated on maximum points of the CIFVC. Accordingly, since the maximum values S* are arguments of the CIFVC in FIG. 5, it is possible to determine that control signals of the AF drivers 12-1 to 12-N enable all the cameras C1 to CN of the camera array 110 to be focused by inversion of the one-to-one relationship between the FVCs and the CIFVCs.

As illustrated in FIG. 3, this operation may be represented as generation of a control signal for the corresponding one of cameras C1 to CN. When lenses of all cameras C1 to CN are positioned according to the control signals of the AF drivers 12-1 to 12-N, focus adjustment of the camera array 110 may be stopped.

As described above, in order to obtain the CIFVC, it may be better to generate one-to-one rules connecting FVCs obtained from all the cameras C1 to CN of the camera array 110.

Hereinafter, an operation of generating the one-to-one rules (an operation of finding a function) is called as CIFVC calibration.

For example, the CIFVC calibration may be performed by analyzing correlation between FVCs obtained from the cameras C1 to CN focused on an identical entity.

In an exemplary embodiment of the present general inventive concept, the CIFVC calibration may be performed in a lab environment as a portion of a production phase. In this operation, each image photographer may independently operate a camera in a detection AF mode other than a typical AF target. The target may be disposed at various distances from an imaging system and imaged. Accordingly, a database may be formed, which stores optimal focus conditions, maximum focus values of the AF drivers 12-1 to 12-N at distances from a target of each camera C1 to CN of the camera array 110, and signals. Since all cameras C1 to CN focus on an identical entity, the CIFVC calibration may be achieved by constructing linear or nonlinear regression for items of the database.

In an exemplary embodiment of the present general inventive concept, the CIFVC calibration may be automatically performed by analyzing a preview image, imaged by a user, for a targeting scene in a background process. This process is called as user's auxiliary calibration of the CIFVC. Like calibration in the lab environment, a database of optimal focus values of AF drivers 12-1 to 12-N and control signals is changed, and correlation between data in other cameras may be used to calculate the CIFVC.

Furthermore, since trustable calibration is possible only for a case of analyzing an image in the entire AF range, construction of this database may take a very long time. Accordingly, a user may use an image by combining the above-described two calibration methods and correcting CIFVC parameters calibrated in a factory. Also, the exemplary embodiment may allow a user to activate inactive CIFVC calibration procedure and to have flexibility in the calibration operation. This may greatly lower power consumption.

In an exemplary embodiment, the CIFVC calibration may be performed by cooperation of a factory and a user. In an imaging device, since a representative sample may be calibrated in a lab, manufacturing time and cost of the camera array 110 may be greatly reduced. Also, a user can remove a problem of auxiliary calibration sample deviation, and compensate for an effect of possible mechanical modification of the camera array 110.

Furthermore, the present general inventive concept may be applicable to a data processing system.

Figure 6:
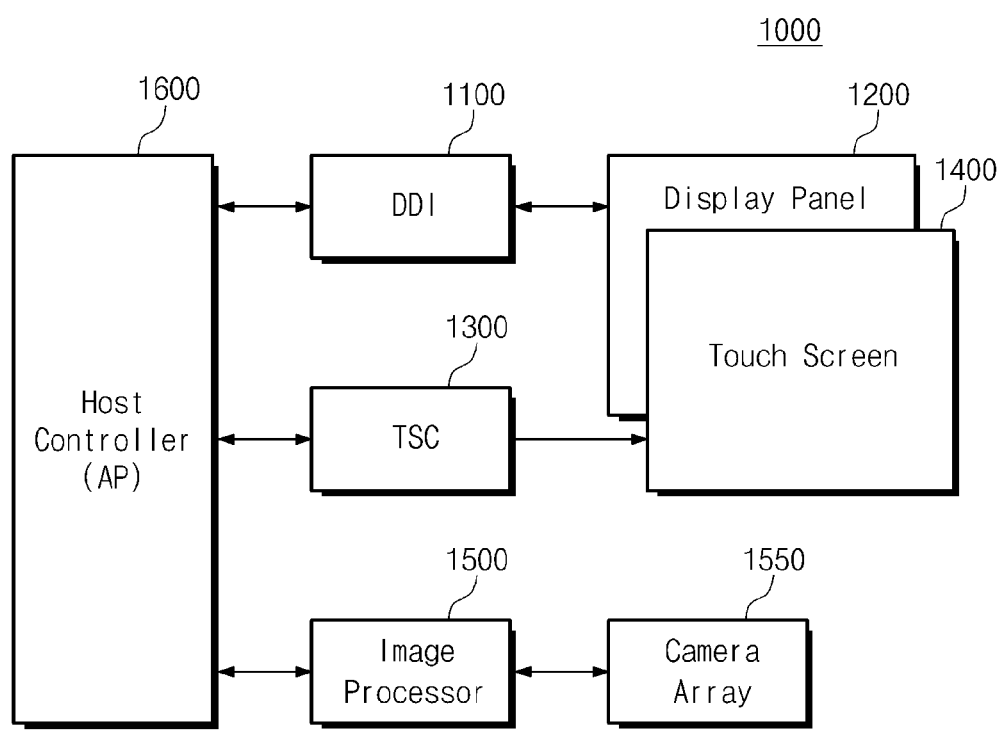
FIG. 6 is a block diagram illustrating an exemplary data processing system according to an exemplary embodiment of the present general inventive concept.

FIG. 6 is a block diagram illustrating an exemplary data processing system 1000 according to an exemplary embodiment of the present general inventive concept. Referring to FIG. 6, the data processing system 1000 includes a display driver integrated circuit (DDI) 1100, a display panel 1200, a touch screen controller (TSC) 1300, a touch screen 1400, an image processor 1500, a camera array 1550, and a host controller 1600.

Inside the data processing system 1000, the display driver integrated circuit 1100 may be implemented to provide display data to the display panel 1200. Also, the touch screen controller 1300 may be connected to the touch screen 1400 superimposed on the display 1200, and receive detection data from the touch screen 1400. The image processor 1500 may control the camera array 1550, and include the control circuit 120 illustrated in FIG. 1. Here, the camera array 1550 may be the camera array 110 illustrated in FIG. 1. The host controller 1600 may be an application processor or a graphic card.

The data processing system 1000 of the present general inventive concept may be applicable to a mobile phone (Galaxy S, Galaxy Note, iPhone, etc.), a tablet PC (Galaxy Tab, iPad, etc.), and a digital camera.

Figure 7:
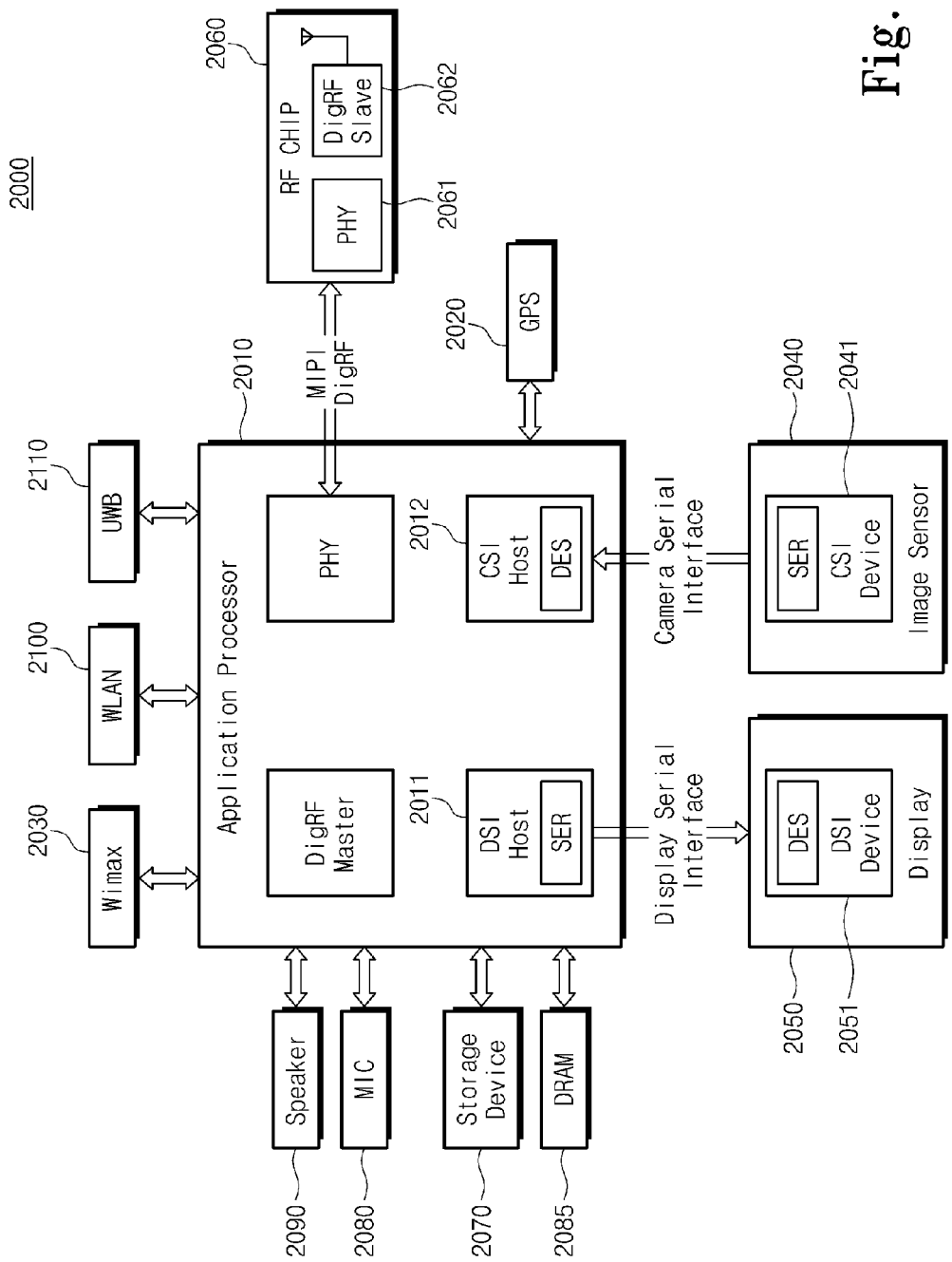
FIG. 7 illustrates an electronic system including an image sensor and interfaces according to an exemplary embodiment of the present general inventive concept.

FIG. 7 illustrates an electronic system 2000 including an image sensor, and interfaces according to an exemplary embodiment of the present general inventive concept. Referring to FIG. 7, the electronic system 2000 may be implemented as a data processing device capable of using or supporting a mobile industry processor interface (MIPI) interface, for example, a mobile phone, a personal digital assistant (PDA), a portable media player (PMP) or a smart phone.

The electronic system 2000 includes an application processor 2010, an image sensor 2040, and a display 2050.

A camera serial interface (CSI) host 2012 implemented in the application processor 2010 may serially communicate with a CSI device 2041 of the image sensor 2040 through a CSI. At this time, for example, an optical deserializer (DER) may be implemented in the CSI host 2012, and an optical serializer (SER) may be implemented in the CSI device 2041.

A display serial interface (DSI) host 2011 implemented in the application processor 2010 may serially communicate with a DSI device 2051 of the display 2050 through a DSI. At this time, for example, an optical serializer may be implemented in the DSI host 2011 and an optical deserializer may be implemented in the DSI device 2051.

The electronic system 2000 may further include a radio frequency (RF) chip 2060 capable of communicating with the application processor 2010. A Physical Layer Device (PHY) 2013 of the electronic system 2000 and a PHY 2061 of the RF chip 2060 may exchange data according to mobile industry processor interface (MIPI) digital RF (DigRF). The RF chip 2060 may communicate with an external device (not illustrated) by sending and/or receiving radio signals through a DigRF Slave 2062.

The electronic system 2000 may further include a global positioning system (GPS) 2020, a storage device 2070, a microphone 2080, a Dynamic Random Access Memory (DRAM) 2085, and a speaker 2090, and perform communication through a Wimax 2030, a wireless LAN (WLAN) 2100, and ultra-wideband (UWB) 2110. The functions of these components are known, and therefore will not be described here in detail.

Exemplary embodiments of the present general inventive concept may be implemented as software, firmware, an application specific integrated circuit (ASIC), or a field programmable gate array (FPGA), or any combination thereof, which is stored by at least one interconnected microchip or integrated circuit, a hardware logic, or a memory device, and executed by a microprocessor, by using a motherboard.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, an imaging system according to the present general inventive concept can rapidly perform AF by including a plurality of independently controllable cameras, dividing an AF range into plural ranges, and scanning the divided ranges in parallel.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An imaging system comprising:
a camera array including a plurality of cameras to image an image; and
a control circuit to control the plurality of cameras to autofocus, and to output a single image by combining images output from the plurality of cameras,
wherein the control circuit estimates focus value curves for the plurality of cameras, and
the control circuit controls at least one of the plurality of cameras based on an estimated focus value curve of at least another one of the plurality of cameras.

2. The imaging system of claim 1, wherein fields of view of the plurality of cameras are partially or completely overlapped.

3. The imaging system of claim 1, wherein at least two of the plurality of cameras have different exposure settings.

4. The imaging system of claim 1, wherein the control circuit is implemented as a single module which is separated from the camera array.

5. The imaging system of claim 1, wherein the camera array is implemented as a monolithic assembly.

6. The imaging system of claim 1, wherein the autofocus is passive contrast detection autofocus.

7. The imaging system of claim 1, wherein controlling the plurality of cameras to autofocus comprises:
dividing an autofocus range to correspond to each of the plurality of cameras; and
controlling the plurality of cameras to scan the divided autofocus range.

8. The imaging system of claim 7, wherein the control circuit scans the divided autofocus range corresponding to each of the plurality of cameras and estimates the focus value curves.

9. The imaging system of claim 1, wherein the control circuit converts the estimated focus value curves into a camera independent focus value curve according to a previously determined correction function.

10. The imaging system of claim 9, wherein the previously determined correction function is determined experimentally or on the basis of data imaged by a user.

11. The imaging system of claim 9, wherein, in the previously determined correction function, the focus value curves and the camera independent focus value curve have a bijective relationship.

12. The imaging system of claim 1, further comprising:
autofocus drivers controlling the plurality of cameras in response to control signals generated from the control circuit for the autofocus.

13. An autofocusing method of an imaging system comprising a camera array including a plurality of cameras and a control circuit independently controlling the plurality of cameras, the autofocusing method comprising:
dividing an autofocus range into a plurality of ranges respectively corresponding to the plurality of cameras;
scanning, by the plurality of cameras, the corresponding divided ranges;
estimating focus value curves by using the scanned results from the plurality of cameras;
converting the estimated focus curves into a camera independent focus value curve by using a previously determined correction function; and
determining autofocus by using the camera independent focus value curve.

14. The autofocusing method of claim 13, wherein the estimating of the focus value curves comprises:
setting lenses of the plurality of cameras to focus along a predetermined distance;
imaging a target image by using the set camera lenses;
selecting a focus region corresponding to the imaged image;
estimating focus values; and
updating the focus value curves by adding the estimated focus values.

15. The autofocusing method of claim 13, wherein the determining of the autofocus comprises,
finding a maximum value from the camera independent focus value curve;
generating control signals corresponding to the maximum value; and
controlling the plurality of cameras in response to the control signals.

16. A non-transitory computer-readable recording medium to contain computer-readable codes as a program to execute the method of claim 13.

17. An imaging system comprising:
a camera array including a plurality of cameras to capture a corresponding plurality of images; and
a control circuit to control each of the plurality of cameras to perform an autofocus operation over a corresponding autofocus range by estimating focus value curves for the plurality of cameras, to determine a camera independent focus value curve based on the focus value curves of the autofocus operation, and to generate an output image by using the determined camera independent focus value curve.

18. The imaging system of claim 17, wherein the control circuit divides the autofocus range into a plurality of ranges respectively corresponding to the plurality of cameras, and
the control circuit controls the plurality of cameras to scan respective divided autofocus ranges.

19. The imaging system of claim 17, wherein the control circuit is configured to find a maximum value from the camera independent focus value curve and to control an autofocus of the plurality of cameras based on the maximum value.

20. The imaging system of claim 17, wherein the control circuit is configured to convert the estimated focus value curves into the camera independent focus value curve.

* * * * *